Sept. 4, 1962  E. S. ROCKS  3,052,129
GYROSCOPIC REFERENCE SYSTEM
Filed Oct. 13, 1960
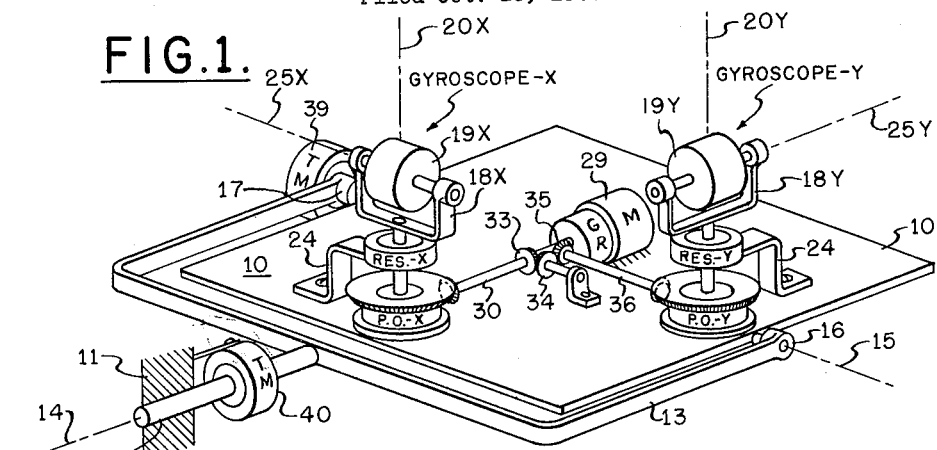
FIG.1.
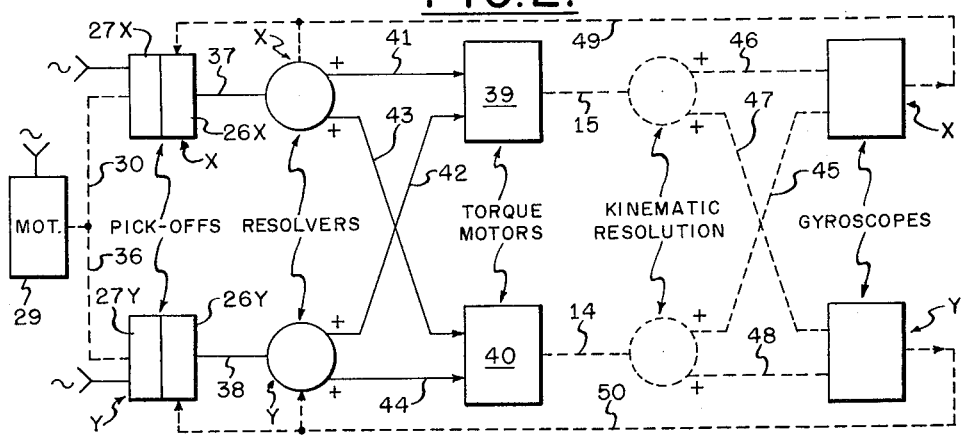
FIG.2.
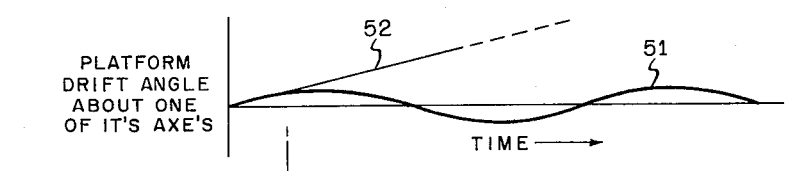
FIG.3
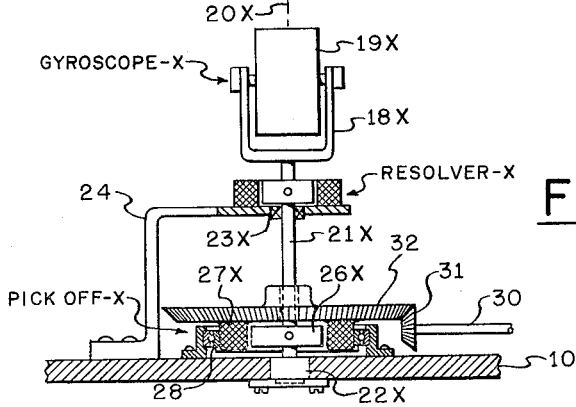
FIG.4.
INVENTOR
EUGENE S. ROCKS
BY
ATTORNEY

United States Patent Office 3,052,129
Patented Sept. 4, 1962

3,052,129
GYROSCOPIC REFERENCE SYSTEM
Eugene S. Rocks, Commack, N.Y., assignor to Sperry Rand Corporation, Great Neck, N.Y., a corporation of Delaware
Filed Oct. 13, 1960, Ser. No. 62,500
9 Claims. (Cl. 74—5.34)

This invention relates to an improved reference system for maneuverable craft that utilizes a pair of drifting gyroscopes to provide vertical stability for a platform carried on the craft with freedom about more than one axis. Known types of gyroscopic platforms as used in inertial navigation systems require speed, or radar, or other long term references due to the inability of the system to distinguish platform drift from distance information where the linear drift resulted in a distance error that increased continuously with elapsed time. In such systems where no speed, radar or other reference was included for correction purposes, the rate of drift of the platform determined the length of time during which the distance information remained sufficiently accurate for use. In the inertial guidance of objects requiring movement in space over a time interval longer than thirty minutes, for example, previous gyroscopically stabilized platforms required the corrective influence of such noted long term references to compensate the system for platform drift.

An object of the present invention is to provide a gyroscopic reference system where the drift error of the platform is oscillatory in character as distinguished from the linear error of known systems. In the improved system, the limited amplitude of the oscillative drift error is entirely independent of time. This obviates the need of the noted accessory long term reference equipment previously required to compensate for drift error in inertial guidance systems.

Further objects of the invention are to provide a system that is usable on short notice, obtains its normal performance level relatively quickly and requires no trimming of the platform for its initial drift.

In accordance with the invention, the stabilizing system includes a pair of drifting gyroscopes each of which is provided with a unidirectionally spinning, normally horizontal rotor and a normally vertical gimbal supported on the platform. The rotors of the respective gyroscopes are arranged with their spin axes mutually perpendicular and the gimbals and rotors are controlled so that the gimbals slowly turn unidirectionally and in the same direction through repeating cycles of 360 degrees. As the rotors of the system move correspondingly, the rotor spin directions and angular momentum vectors of the gyroscopes reverse cyclically while the vector representative of the resultant spacial torque causing the platform to drift remains relatively fixed. Accordingly, each of the rotors of the system move through alternating half cycles of 180 degrees between which the same change their effective spin directions and reverse the direction of their momentum vectors with respect to the fixed vector. For this reason, the drift error of the improved system is oscillatory in character rather than linear. The system operates to reduce the net angular drift of the platform about its axes for periods other than the turning period of the gimbals and rotors of the stabilizing gyroscopes.

Further objects, features and structural details of the invention will be apparent from the following description when read in relation to the accompanying drawing, wherein, FIG. 1 is a perspective view of a gyroscopic platform arrangement constructed in accordance with the present inventive concepts, FIG. 2 is a combined schematic view and circuit diagram of the improved system, FIG. 3 is a curve showing the platform drift angle about one of its axes, and FIG. 4 is an enlarged elevation view showing the structural arrangement of one of the gyroscopes of the system on the platform.

As shown in the drawing, the stable element of the improved system is provided by a platform indicated at 10. The system includes two gyroscopes as respectively indicated at X and Y that provide stability for the stable element or platform on which they are mounted. As illustrated in FIG. 1, the platform 10 is represented as carried on a craft having a relatively fixed frame part 11 with a bearing 12 that supports gimbal ring 13 with freedom about a normally horizontal axis 14. Platform 10 is universally supported with relation to the fixed frame 11 of the craft by means of the ring 13, the other axis 15 of the support being provided by suitable bearings 16 and 17 on the ring 13. As the axes 14 and 15 are perpendicular, the platform 10 of the system is carried on the craft with freedom about mutually perpendicular, normally horizontal axes by means of the ring 13.

The means for stabilizing the platform 10 is provided by the gyroscopes X and Y. The first gyroscope X and the second gyroscope Y consist of identical gimbal and rotor components respectively indicated at 18X, 18Y for the gimbal and 19X, 19Y for the rotor. Suitable driving means (not shown) are provided to spin the respective rotors 19X, 19Y of the pair of gyroscopes X and Y unidirectionally at a constant speed. The spin directions of the respective rotors 19X, 19Y are not reversed with relation to their associated gimbal components 18X, 18Y. The gyroscopes X and Y shown in FIG. 1 are of a single degree of freedom type where the gimbals 18X, 18Y are supported on the platform 10 with freedom about the spaced parallel vertical axes 20X and 20Y. For axis 20X the gyroscope X is supported by an extending trunnion 21X on gimbal 18X that journals in the thrust bearing 22X and bearing 23X in FIG. 4. The thrust bearing 22X of the arrangement illustrated is located on the platform 10 and bearing 23X is suitably spaced therefrom by a bracket 24 that is fixedly connected to the platform 10 and includes the bearing 23X thereon. Corresponding detail structure is provided to support the vertical gimbal 18Y of the gyroscope Y on the platform 10 with freedom about axis 20Y. The gyroscopic means included in the system for stabilizing the platform further provides that the spin axes of the rotors of the respective paired gyroscopes X and Y be spaced in perpendicular relation. The normally horizontal spin axis 25Y of the spinning rotor 19Y is accordingly shown in FIG. 1 as perpendicular to the normally horizontal spin axis 25X of the spinning rotor 19X. In the gyroscopic arrangement shown, the rotor spin axis 25X is normal to the vertical gimbal axis 20X and the rotor spin axis 25Y is normal to the vertical gimbal axis 20Y by construction. The respective gimbals 18X and 18Y support their related rotors 19X and 19Y thereon to spin about the indicated axes 25X and 25Y.

In the improved system, a pick-off and a resolver are provided for each of the paired gyroscopes X and Y. As shown in FIG. 4, for gyroscope X, the related pick-off X is provided by a suitable electrical transmitter such as a selsyn device having a wound part 26X connected to the gimbal 18X through the extending trunnion 21X. The other wound part 27X of the pick-off X is mounted for movement with relation to the platform 10 and to the gimbal connected part 26X by means of a bearing 28 on the platform. The means for driving the part 27X of pick-off X is provided by a suitable motor 29 that is carried by the platform 10 and is operatively connected to the part 27X through suitable gear reduction GR, output shaft 30 and bevel gears 31 and 32. The pick-off Y for gyroscope Y is identical in structure to the described pick-off X, the part thereof 27Y corresponding to movable part 27X being driven by the motor 29 through shaft 30, bevel gear 33, idler gear 34, bevel gear 35 and connecting shaft 36. The corresponding parts of the respective pick-offs X and Y are moved by the motor 29 through the described mechanical connections unidirectionally and in the same direction with relation to the platform 10 at the same constant slow speed that may for example be one revolution in fifteen minutes. The relatively slow speed of rotation of the driven pick-off parts may be altered to suit the needs of a particular system by changing the gear reduction or the constant speed of motor 29 included therein so that the amplitude of the oscillatory drift angle is maintained within the predetermined limits desired. Like the spin axes of the gyroscopes X and Y, the nulls of the corresponding pick-off parts 27X and 27Y are fixedly arranged in the system in mutually perpendicular relation. Accordingly, the parts 27X and 27Y are slowly and unidirectionally moved by the motor 29 operating through the reduction gearing at a constant speed. The orientation between the nulls of the pick-offs X and Y is fixed by construction. The platform torquers 39 and 40 force the pick-off outputs to zero by precessing the gyroscopes to follow the pick-off portions 27X and 27Y. The means for rotating the rotatable pick-off parts 27X and 27Y both with relation to the platform 10 and the gimbal connected parts 26X and 26Y is provided by the motor 29 and the mechanical connections between the driven parts and the motor. Motor 29 of the system may be a constant speed alternating current motor operated from a suitable source of alternating current electrical energy as indicated in FIG. 2.

The system also includes means for resolving the outputs of the respective pick-offs X and Y into components corresponding to the axes 14 and 15 of the platform 10. As shown, such means is provided by a suitable electrical resolver X for the gyroscope X and an identical resolver Y for the gyroscope Y. In FIG. 4, the wound rotor part of the resolver X is fixedly connected to the extending trunnion 21X of the gimbal 18X and the wound stator part is suitably fixed to the bracket 24 on the platform 10. In the schematic view FIG. 2, a lead 37 connects the resolver X to the wound part 26X of the pick-off X and lead 38 connects the resolver Y to the wound part 26Y of the pick-off Y. Depending on the instantaneous positions of the gyroscopes X and Y as the system operates to move the gimbals and rotors thereof about the axes 20X and 20Y, the resolvers X and Y with parts fixed to the platform and parts fixed to the rotating gimbals 18X and 18Y operate to apportion their outputs thereof between the platform axes 14 and 15. The respective outputs of the resolvers X and Y are utilized to control a suitable torque motor 39 at axis 15 that is mounted on the ring 13 and a suitable torque motor 40 at axis 14 that is mounted on the frame part 11. As represented in FIG. 2, the input to the motor 39 exerting a torque about platform axis 15 is the sum of that signal provided by a lead 41 connecting the motor 39 to resolver X and a signal provided by lead 42 connecting the motor 39 to the resolver Y. Similarly, the input to the motor 40 exerting a torque about platform axis 14 is the sum of that signal provided by a lead 43 connecting the motor 40 to the resolver X and a signal provided by lead 44 connecting the motor 40 to the resolver Y. The torques exerted about the platform axes 15 and 14 by the respective torquer motors 39 and 40 are resolved kinematically so that the gimbals 18X, 18Y and rotors 19X, 19Y turn about the axes 20X, 20Y slowly and continuously depending on the input to the system from the pick-offs X and Y. The torque exerted about the respective axes 15 and 14 is also dependent on the output components of the provided resolvers X and Y. As the resolution of the torques provided the system by the motors 39 and 40 is kinematic, it is represented in FIG. 2 as providing a mechanical input 45 to gyroscope X from torque motor 40 and a mechanical input 46 to gyroscope X from torque motor 39. Similarly, gyroscope Y is controlled by a mechanical input 47 from torque motor 39 and a mechanical input 48 from torque motor 40. A mechanical input 49 is also shown in FIG. 2 connecting gyroscope X and pick-off part 26X and resolver X. A further mechanical input 50 connects gyroscope Y to the pick-off part 26Y and resolver Y.

In the operation of the system, the rotors 19X, 19Y and vertical gimbals 18X, 18Y slowly turn about axes 20X and 20Y under the control of the motor 29 through the pick-offs X, Y, resolvers X, Y, and torque motors 39 and 40. This motion about axes 20X and 20Y is unidirectional and in the same direction for both the gyroscopes X and Y with the spin axes 25X and 25Y maintaining their mutually perpendicular relation. With respect to a relatively fixed drift causing vector representative of a net disturbing torque along axes 20X and 20Y on the system, the unidirectionally spinning rotors 19X, 19Y effectively change their direction of spin once in each 360 degree revolution cycle of the rotors 19X, 19Y about axes 20X, 20Y. In half the cycle, the respective rotors with regard to the disturbing torque vector may be considered to be precessing clockwise and in the other half counterclockwise. The direction of the angular momentum vector of the gyroscopes X and Y is dependent on the spin directions of the respective rotors thereof. As the spin directions of the rotors of the gyroscopes of the system effectively change with respect to the disturbing vector with movement about axes 20X, 20Y, the momentum vector of the respective gyroscopes X and Y also reverse their directions with respect to the disturbing vector. The result of this cyclic reversal in the system causes the platform 10 to drift about axes 15, 14 sinusiodally as shown for one of its axes by the sine curve 51 in FIG. 3. In known systems, the drift angle of the platform increases linearly with time as shown by the straight line 52, in FIG. 3 The amplitude of the drift angle error is independent of time and may be maintained within acceptable limits by regulation of the speed of movement of the pick-off parts 26X and 26Y of the system.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A gyroscopic reference system for maneuverable craft including a platform carried on the craft with freedom about mutually perpendicular, normally horizontal axes; a first stabilizing gyroscope including a rotor supported on the platform to spin about a normally horizontal axis by a first gimbal having a normally vertical axis, means for spinning the first gyroscopic rotor unidirectionally about its horizontal axis; a second stabilizing gyroscope including a rotor supported on the platform to spin about a normally horizontal axis perpendicular to the rotor axis of the first gyroscope by a second gimbal having a normally vertical axis, means for spinning the second gyroscopic rotor unidirectionally about its horizontal axis; a first pick-off for the first gyroscope having a part connected to the first gimbal and a part mounted for movement with relation to the platform and to the gimbal connected part to provide an output, a second pick-off for the second gyroscope having a part connected to the second gimbal and a part mounted for movement with relation to the platform and to the gimbal connected part to provide an output, means operatively connected to the movable parts of the first and second pick-offs for moving the parts unidirectionally and in the same direction with relation to the platform at the same constant slow speed, a first means for resolving the output of the first pick-off into components corresponding to the axes of the platform, a second means for resolving the output of the second pick-off into components corresponding to the axes of the platform, and means for exerting torques about the platform axes responsive to the output components of said first and second resolving means operable to turn the first and second gimbals and rotors about the gimbal axes slowly and continuously depending on the input to the system from the moving means.

2. A gyroscopic reference system for maneuverable craft including a platform carried on the craft with freedom about mutually perpendicular, normally horizontal axes, a first stabilizing gyroscope with a rotor spinning unidirectionally about a normally horizontal axis supported on the platform by a first gimbal having a normally vertical axis, a second stabilizing gyroscope with a rotor spinning unidirectionally about a normally horizontal axis perpendicular to the rotor axis of the first gyroscope supported on the platform by a second gimbal having a normally vertical axis, a pick-off for the respective first and second gyroscopes having parts connected to the respective first and second gimbals and parts mounted for rotation with relation to the platform and to the gimbal connected parts to provide an output, means for rotating the rotatable pick-off parts unidirectionally and in the same direction with relation to the platform at the same constant slow speed, means for resolving the outputs of the respective pick-offs into components corresponding to the axes of the platform, and means for torquing the platform about its respective axis depending on the output components of said resolving means.

3. A gyroscopic reference system for maneuverable craft including a platform carried on the craft with freedom about mutually perpendicular, normally horizontal axes, gyroscopic means for stabilizing the platform inaxes, including a pair of unidirectionally spinning rotors supported on the platform by respective gimbals having normally vertical axes with the spin axes thereof mutually perpendicular and normally horizontal, a pick-off for each of the rotors having a part connected to a gimbal and a part mounted for movement with relation to the platform and to the gimbal connected part to provide an output, means connected to move the respective movable pick-off parts unidirectionally and in the same direction at the same constant slow speed, means for resolving the outputs of the pick-offs into components corresponding to the axes of the platform, and means for exerting torques about the platform axes responsive to the output components of the resolving means operable to turn the respective gimbals and rotors of the gyroscopic means about the gimbal axes slowly and continuously depending on the input to the system from the moving means.

4. A gyroscopic reference system for maneuverable craft including a platform carried on the craft with freedom about mutually perpendicular, normally horizontal axes, a pair of gyroscopes for stabilizing the platform having respective unidirectionally spinning rotors with mutually perpendicular, normally horizontal, spin axes supported on the platform by respective gimbals having normally vertical axes, a first pick-off having a part connected to one of the gimbals and a part mounted for movement with relation to the platform and to the gimbal cannected part to provide an output, a second pick-off having a part connected to the other of the gimbals and a part mounted for movement with relation to the platform and to the gimbal connected part to provide an output, motive means carried by the platform connected to move the movable parts of the first and second pick-offs unidirectionally and in the same direction at the same constant slow speed, means for resolving the outputs of the first and second pick-offs into components corresponding to the axes of the platform, and means responsive to the output components of said resolving means for exerting torques about the respective axes of the platform.

5. A gyroscopic reference system for maneuverable craft including a platform carried on the craft with freedom about mutually perpendicular, normally horizontal axes, a pair of gyroscopes for stabilizing the platform having respective unidirectionally spinning rotors with mutually perpendicular, normally horizontal, spin axes supported on the platform by respective gimbals having normally vertical axes, a pick-off for each of the gyroscopes having a part connected to the gimbal and a part mounted for movement with relation to the platform and to the gimbal connected part to provide an output, means connected to move the movable parts of the respective pick-offs unidirectionally and in the same direction at the same constant slow speed, first means for resolving the output of one of the pick-offs into components corresponding to the axes of the platform, second means for resolving the output of the other of the pick-offs into components corresponding to the axes of the platform, means for exerting a torque about one of the axes of the platform responsive to one of the output components of the first and second resolver means, and means for exerting a torque about the other of the axes of the platform responsive to the other output component of the first and second resolver means.

6. In a gyroscopic reference system, a platform having mutually perpendicular, normally horizontal axes of freedom, a gyroscope having a unidirectionally spinning rotor supported by a gimbal on the platform with the axis of the rotor normally horizontal and the axis of the gimbal normally vertical to provide stability for the platform, a pick-off having a part connected to the gimbal and a part mounted for movement with relation to the platform and to the gimbal connected part to provide an output, means for moving the movable part of the pick-off unidirectionally at a constant slow speed, means for resolving the output of the pick-off into components corresponding to the axes of the platform, means for exerting a torque about one of the axes of the platform responsive to one of the output components of the resolving means, and means for exerting a torque about the other of the axes of the platform responsive to the other output component of the resolving means.

7. In a system of the class described, a platform having mutually perpendicular axes, means for stabilizing the platform with its axes normally horizontal including a gyroscope having a unidirectionally spinning rotor supported on the platform by a gimbal with the axis of the rotor normally horizontal and the axis of the gimbal normally vertical, a two-part pick-off providing an output having a part connected to the gimbal and a part mounted to rotate with relation to the platform and to the gimbal connected part, means for driving said rotatable pick-off part unidirectionally at a constant slow speed, means for resolving the output of the pick-off into components corresponding to the axes of the platform, and means for exerting torques about the platform axes responsive to the output components of the resolving means.

8. A system of the class described including a platform having mutually perpendicular axes, gyroscopic means for stabilizing the platform with its axes normally horizontal including a pair of rotors having mutually perpendicular, normally horizontal, spin axes supported in the platform by respective gimbals having normally vertical axes, a first two-part pick-off providing an output having a part connected to one of the gimbals and a part mounted to rotate with relation to the platform, a second two-part pick-off providing an output having a part connected to the other of the gimbals and a part mounted to rotate with relation to the platform, means for driving the rotatable parts of the first and second pick-offs undirectionally and in the same direction at the same constant slow speed, means for resolving the outputs of the first and second pick-offs into components corresponding to the axes of the platform, means for exerting a torque about one of the axes of the platform responsive to one of the output components of the resolving means, and means for exerting a torque about the other of the axes of the platform responsive to the other of the output components of the resolving means.

9. In a system of the class described, a platform having mutually perpendicular axes, means for stabilizing the platform with its axes normally horizontal including a gyroscope having a unidirectionally spinning rotor supported on the platform by a gimbal with the axis of the rotor normally horizontal and the axis of the gimbal normally vertical, means providing an output including a two-part pick-off having a part connected to the gimbal and a part mounted on the platform moving unidirectionally and slowly with relation to the gimbal connected part, means for resolving the output of said output means into components corresponding to the axes of the platform, and means for exerting torques about the platform axes responsive to the respective components of the resolving means.

References Cited in the file of this patent

UNITED STATES PATENTS

| | | |
|---|---|---|
| 2,414,291 | Evans | Jan. 14, 1947 |
| 2,470,773 | Haskins | May 24, 1949 |
| 2,941,406 | Singleton et al. | June 21, 1960 |
| 2,954,700 | Deschamps | Oct. 4, 1960 |